(12) United States Patent
Willems

(10) Patent No.: US 9,541,154 B2
(45) Date of Patent: Jan. 10, 2017

(54) ROTARY DAMPER

(75) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 160 days.

(21) Appl. No.: 14/118,165

(22) PCT Filed: May 10, 2012

(86) PCT No.: PCT/EP2012/002007
§ 371 (c)(1),
(2), (4) Date: Jan. 9, 2014

(87) PCT Pub. No.: WO2012/156047
PCT Pub. Date: Nov. 22, 2012

(65) Prior Publication Data
US 2014/0360825 A1 Dec. 11, 2014

(30) Foreign Application Priority Data
May 17, 2011 (DE) .................. 10 2011 101 701

(51) Int. Cl.
*F16F 13/00* (2006.01)
*F16F 9/00* (2006.01)
(Continued)

(52) U.S. Cl.
CPC ............... *F16F 13/06* (2013.01); *B60G 11/23* (2013.01); *B60G 13/16* (2013.01); *B60G 13/18* (2013.01); *B60G 15/06* (2013.01); *B60G 17/025* (2013.01); *F16F 9/12* (2013.01); *F16F 9/145* (2013.01); *F16F 15/03* (2013.01); *F16F 15/1442* (2013.01); *B60G 2202/1424* (2013.01); *B60G 2202/22* (2013.01); *B60G 2202/30* (2013.01); *B60G 2202/42* (2013.01); *B60G 2202/442* (2013.01); *B60G 2204/419* (2013.01); *B60G 2204/4191* (2013.01)

(58) Field of Classification Search
USPC .................................................. 267/281, 306
See application file for complete search history.

(56) References Cited

U.S. PATENT DOCUMENTS 1,752,844 A * 4/1930 Harrison .................... 310/93
2,191,211 A * 2/1940 Krotz ........................ 267/274
(Continued)

FOREIGN PATENT DOCUMENTS

| CN | 1553997 A | 12/2004 |
|---|---|---|
| CN | 1948782 A | 4/2007 |

(Continued)

OTHER PUBLICATIONS

Chinese Search Report issued on Apr. 1, 2015 with respect to counterpart Chinese patent application 201280024100.7.
(Continued)

*Primary Examiner* — Robert A Siconolfi
*Assistant Examiner* — James Hsiao
(74) *Attorney, Agent, or Firm* — Henry M. Feiereisen LLC.

(57) ABSTRACT

A rotary damper for a motor vehicle includes at least one damper element for damping the relative movement of a first mass located on the wheel-suspension side and of a second mass located on the vehicle-body side, with at least one vibration absorber (8) being arranged on the rotary damper (1).

14 Claims, 3 Drawing Sheets

(51) Int. Cl.

| | |
|---|---|
| *F16F 13/06* | (2006.01) |
| *B60G 13/16* | (2006.01) |
| *B60G 13/18* | (2006.01) |
| *F16F 9/14* | (2006.01) |
| *F16F 15/03* | (2006.01) |
| *F16F 15/14* | (2006.01) |
| *F16F 9/12* | (2006.01) |
| *B60G 11/23* | (2006.01) |
| *B60G 15/06* | (2006.01) |
| *B60G 17/02* | (2006.01) |

(56) References Cited

U.S. PATENT DOCUMENTS

| | | | | |
|---|---|---|---|---|
| 2,270,572 | A * | 1/1942 | Woolson et al. | 267/281 |
| 3,361,442 | A * | 1/1968 | Willetts | 280/682 |
| 4,690,069 | A * | 9/1987 | Willetts | 105/224.1 |
| 4,768,630 | A * | 9/1988 | Aubry et al. | 188/290 |
| 5,005,859 | A * | 4/1991 | Satoh et al. | 280/124.13 |
| 5,405,159 | A * | 4/1995 | Klein et al. | 280/283 |
| 5,445,049 | A * | 8/1995 | Ullrich et al. | 74/574.4 |
| 5,503,043 | A * | 4/1996 | Olbrich | 74/574.4 |
| 5,575,502 | A * | 11/1996 | Oppitz et al. | 280/124.166 |
| 5,632,502 | A * | 5/1997 | Oppitz et al. | 280/124.106 |
| 5,882,017 | A * | 3/1999 | Carleer | 280/5.508 |
| 5,913,392 | A | 6/1999 | Eckel et al. | |
| 6,145,858 | A * | 11/2000 | Foulquier | 280/124.13 |
| 6,176,496 | B1 | 1/2001 | Busch | |
| 6,435,491 | B1 * | 8/2002 | Blondelet et al. | 267/279 |
| 6,575,441 | B2 * | 6/2003 | Lefebvre | 267/281 |
| 7,175,167 | B2 * | 2/2007 | Pennequin et al. | 267/195 |
| 7,273,117 | B2 * | 9/2007 | Pond | 180/24.02 |
| 8,042,823 | B2 * | 10/2011 | Cusack | 280/283 |
| 8,985,604 | B2 * | 3/2015 | Hopson et al. | 280/124.134 |
| 2002/0065171 | A1 * | 5/2002 | Raber | 477/175 |
| 2003/0102193 | A1 | 6/2003 | Edmondson et al. | |
| 2004/0222755 | A1 | 11/2004 | Fariborzi et al. | |
| 2004/0232632 | A1 * | 11/2004 | Beck et al. | 280/5.5 |
| 2005/0023052 | A1 * | 2/2005 | Beck et al. | 180/24.07 |
| 2005/0224260 | A1 | 10/2005 | Ayling | |
| 2010/0300399 | A1 * | 12/2010 | Andreini | 123/205 |
| 2013/0154277 | A1 * | 6/2013 | Willems | 290/1 C |

FOREIGN PATENT DOCUMENTS

| | | |
|---|---|---|
| DE | 41 11 233 | 10/1992 |
| DE | 43 15 483 | 11/1994 |
| DE | 196 05 551 | 8/1997 |
| DE | 694 05 367 | 3/1998 |
| DE | 196 47 300 | 5/1998 |
| DE | 100 43 711 | 5/2002 |
| DE | 101 16 897 | 10/2002 |
| DE | 102 18 320 | 6/2003 |
| DE | 103 06 228 | 9/2004 |
| DE | 102005013379 | 2/2007 |
| DE | 603 12 666 | 11/2007 |
| DE | 102007003950 | 7/2008 |
| DE | 602 26 122 | 5/2009 |
| DE | 102006054452 | 6/2011 |
| EP | 0 628 746 | 12/1994 |
| EP | 1 935 679 | 6/2008 |
| JP | 03-239619 | 10/1991 |
| JP | 2001-055033 | 2/2001 |
| JP | 2002-316524 | 10/2002 |

OTHER PUBLICATIONS

Translation of Chinese Search Report issued on Apr. 1, 2015 with respect to counterpart Chinese patent application 201280024100.7.

* cited by examiner

ROTARY DAMPER

CROSS-REFERENCES TO RELATED
APPLICATIONS

This application is the U.S. National Stage of International Application No. PCT/EP2012/002007, filed May 10, 2012, which designated the United States and has been published as International Publication No. WO 2012/156047 and which claims the priority of German Patent Application, Serial No. 10 2011 101 701.5, filed May 17, 2011, pursuant to 35 U.S.C. 119(a)-(d).

BACKGROUND OF THE INVENTION

The invention relates to a rotary damper for a motor vehicle, including at least one damper element for damping the relative movement between a first mass, arranged on the side of a wheel suspension, and a second mass, arranged on a side of the vehicle body.

Many areas of technology require damping of relative movements between two components of a vibratory mechanical system. One example involves vibration damping on a motor vehicle body in the region of the suspension of the body on the chassis. Hydraulic dampers, such as in the form of linearly acting telescopic dampers are used for example for this purpose.

Rotary dampers represent an alternative to the aforementioned telescopic dampers and are known per se. The mode of operation of a rotary damper is based in principle on a lever element which is arranged on a side of the wheel suspension and movable during a relative mass movement and which is directly or indirectly dynamically coupled with a rotatably mounted damper part of the damper element pertaining to the rotary damper so that the respective damper part is caused to rotate.

In view of the ever increasing demands on comfort and acoustics of modern motor vehicles, also the demands on absorption capability of the damper system increase with respect to vibrations caused during operation of the motor vehicle.

Known approaches for increasing the absorption capability of the damper system include in particular the use of so-called elastomer bearings, i.e. bearings formed of elastomer material. Additional measures are generally limited by the known tight space constraints within a wheel well that receives a respective rotary damper.

SUMMARY OF THE INVENTION

The invention is based on the problem to provide a rotary damper which is improved in particular in relation to the absorption capability of vibrations experienced during operation of the motor vehicle.

This problem is solved by a rotary damper of the aforementioned type which is characterized in that at least one vibration absorber is arranged on the rotary damper.

The invention is based on the idea to directly attach one or more vibration absorbers on the rotary damper in order to dampen in this way vibrations caused during operation of the motor vehicle and/or the rotary damper. The at least one vibration absorber is thus a direct component of the rotary damper to thereby enable attenuation especially of respective vibrations before their propagation into the passenger compartment where they are normally perceived as annoying.

The solution according to the invention further takes into account the limited space situation within the wheel well of a motor vehicle since the vibration absorber requires little installation space as a result of its direct arrangement on the rotary damper.

The vibration absorber used according to the invention may be provided in the embodiment still to be described hereinafter and may be suited both individually and according to need to a respect frequency spectrum of vibrations so that high-frequency or low-frequency vibrations for example can be attenuated in a targeted manner. In particular, acoustically perceivable frequencies can be attenuated. By way of example only, respectively configured vibration absorbers are able to dampen vibrations in the range of 1 kHz to 30 kHz.

The damper element provided in accordance with the invention has normally a fixed first damper part and a second damper part which is rotatably mounted in relation thereto while forming a damping force and which is connected to a lever element that is movable by the mass movement and connected to the first mass, with the lever element transmitting a rotary movement to the second damper part upon a mass movement, wherein the at least one vibration absorber is arranged on the second damper part and/or the lever element.

The vibration absorber can include at least one elastically resilient damping spring element and at least one damping mass connected thereto. Damping spring element and damping mass form hereby an autonomous vibration system which acts in opposition to the vibration system of the rotary damper, i.e. weakens and thus dampens it. Depending on the concrete, especially material and constructive configuration of the damping spring element and the damping mass, vibrations of different frequency can be dampened accordingly.

The connection of the damping spring element and the damping mass may be realized especially via a vibration-transmitting connection, like for example gluing, welding, riveting. Basically, the connection of the damping spring element with the damping mass may be detachable or permanent.

The damping spring element is formed for example as mechanical spring or rubber-elastic elastomeric member. The damping mass is for example a mass body formed of elastomer and/or metal. Thus, the damping mass may be a steel ring around which an elastomer is molded at least in part, or a metal body which is covered, at least in part, by an elastomer.

With respect to the constructive realization of the damper element, the damper element can include a hollow-cylindrical housing in which the first and second damper parts are received. The housing is detachably or permanently connected with the vehicle body by for example screw or rivet connections in particular via at least a housing portion provided with respective fastening zones. It is hereby possible to configure both the first and second damper parts as hollow-cylindrical body, with either the first damper part being received within the second damper part or the second damper part being received within the first damper part. The arrangement in any event is such that the second damper part, dynamically coupled with the lever element, is rotatable in relation to the first fixed damper part. The first or the second damper part may be configured as part of or integrated in the housing of the damper element so that the housing is rotatably mounted when the second damper part forms a part of the housing of the damper element.

It is further conceivable to arrange a gear mechanism between the lever element and the damper element, with at least a first gear element dynamically coupled with the lever element and caused to rotate via the latter, and with at least a second gear element coupled directly or indirectly translated with the first gear element and dynamically coupled with the second damper part such as to cause a rotary movement of the second damper part. The interposition of a gear mechanism permits a multiplication of movements of the lever element so that comparably slight movements or deflections of the lever element result in comparably high revolutions or rotation speeds of the second damper part of the damper element. Accordingly, the damping effect of the damper element can be increased.

The gear mechanism may be configured for example in the form of a planetary gear mechanism, strain wave gear mechanism, cycloidal gear mechanism, or spur gear mechanism. Other gear constructions are, of course, also conceivable.

The rotary damper can be constructed as hydraulic rotary damper with at least one hydraulic damper element or as electric rotary damper with at least one electric damper element. In the former case, the damping effect of the damper element is based on the circulation of a fluid, such as for example a suitable hydraulic oil or the like, which is received in a volume of the damper element. In the latter case, the damper element is capable to convert mechanical energy into electric energy. The rotary damper includes in this configuration a generator operated by the mass movement and having a stationary stator, a rotor rotatable in relation thereto, and, advantageously, a gear mechanism coupled with the generator. The operating principle of the electric damper is based on the coupling of the generator with the gear mechanism, with the output element of the gear mechanism transmitting to the rotor a rotary movement initiated by the lever element that is directly coupled with the drive element of the gear mechanism. The rotary movement introduced into the rotor causes damping via the generator and the recovery or conversion of the mechanical damper energy, initially resulting from the mass movement, into current generated on the generator side.

BRIEF DESCRIPTION OF THE DRAWING

Further advantages, features and details of the invention become apparent from the exemplary embodiments described hereinafter and with reference to the drawings. It is shown in.

DETAILED DESCRIPTION OF PREFERRED EMBODIMENTS

Figure 1:
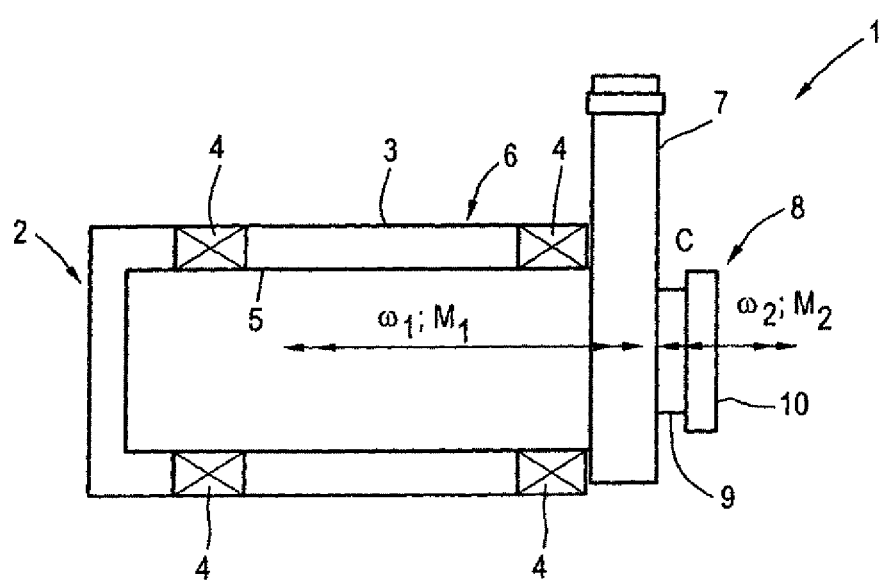
FIG. 1 a basic illustration of a first exemplary embodiment of a rotary damper.

FIG. 1 shows a basic illustration of a rotary damper 1 according to a first exemplary embodiment by way of a sectional view. The rotary damper 1 is installed within a wheel well of a motor vehicle (not shown) and includes a damper element 2 for damping the relative movement between a first mass, disposed on the wheel-suspension side, and a second mass, disposed on the vehicle-body side. The damping element 2 may be designed, for example, as an electric or hydraulic damper.

The damping element 2 has a fixed first damper part 3 and a second damper part 5 mounted rotatably relative thereto via bearing elements 4 to generate a damping force. The first damper part 3 may also serve as housing 6 of the damper element 2. The housing 6 and the damper parts 3, 5 have each a hollow-cylindrical shape. The second damper part 5 is connected via a lever element 7 (articulated lever) which can be moved or pivoted by the mass movement and is connected to the first mass. The lever element 7 transmits a rotary movement $\omega 1$ or a torque M1 during a mass movement to the second damper part 5. This can produce acoustically perceptible vibrations which are typically perceived as unpleasant by the passenger entering the passenger compartment.

Thus, a vibration absorber 8 is arranged on the lever element 7. The vibration absorber 8 includes an especially disk-shaped elastically resilient damping spring element 9 and a damping mass 10 which is connected thereto and is especially disk-shaped. The damping spring element 9 is constructed for example as mechanical steel spring with a defined spring constant c. The damping mass 10 is for example realized as inertia body of elastomeric material.

The vibration absorber 8 represents a separate vibration system which suppresses vibrations, encountered during operation of the rotary damper 1 and the motor vehicle through rolling off for example and caused in particular as a result of the rotary movement $\omega 1$ or the torque M1, by a damping rotary movement $\omega 2$ or a torque M2 effected by the moment of inertia of the damping mass 10. The torque M2 of the vibration absorber 8 is phase-shifted in relation to the torque M1 and realizes in this way an attenuation of the torque M1 and thus suppression of the vibrations produced by the latter.

Figure 2:
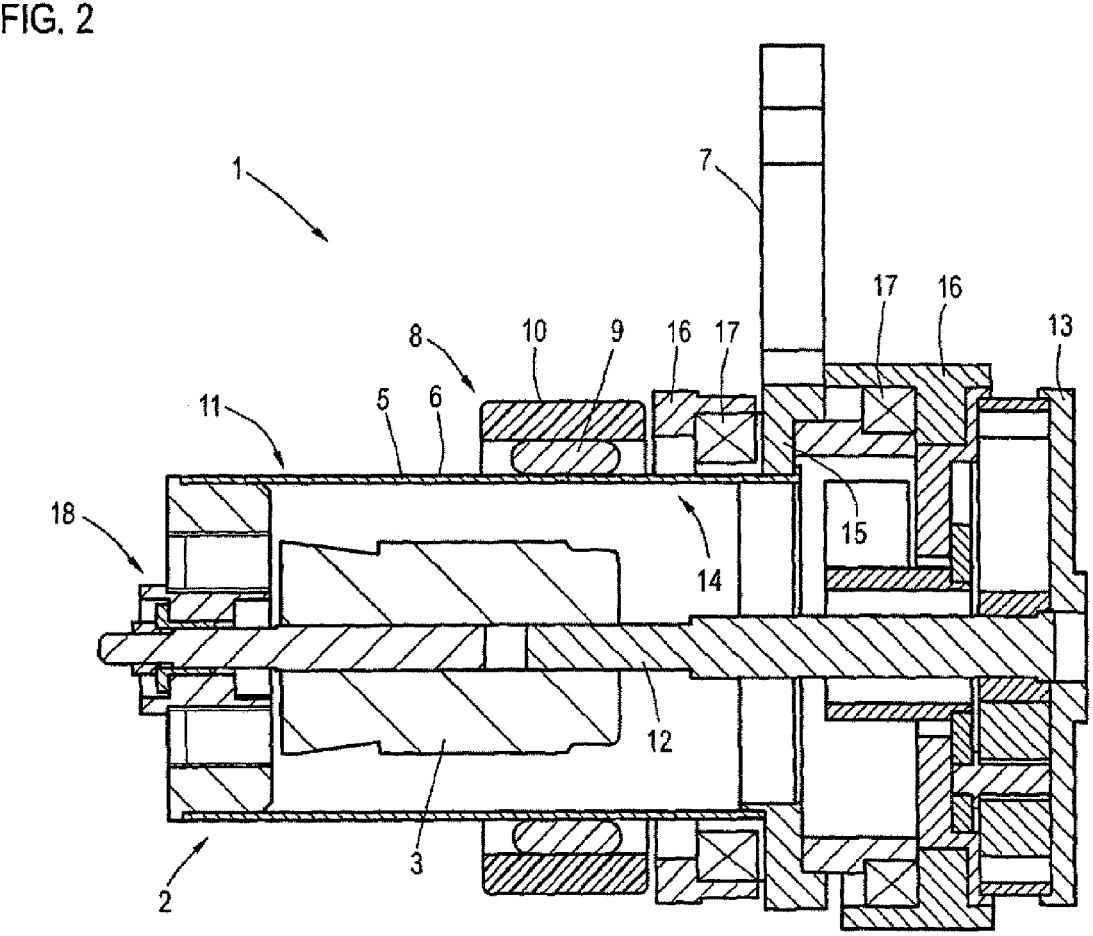
FIG. 2 a basic illustration of a second exemplary embodiment of a rotary damper.
Figure 3:
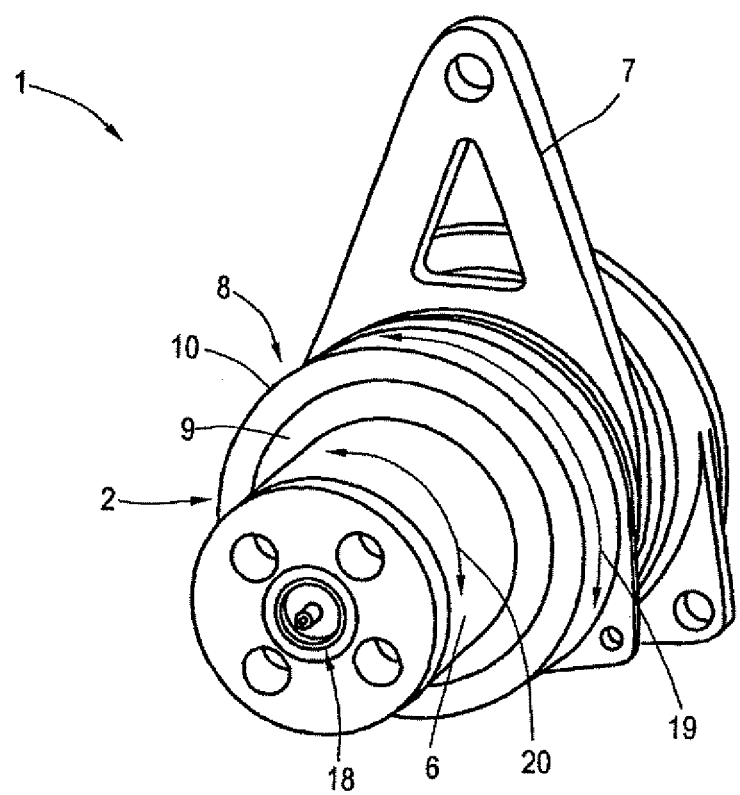
FIG. 3 a front perspective illustration of the rotary damper shown in FIG. 2.

FIG. 2 shows a basic illustration of a rotary damper 1 according to a second exemplary embodiment, FIG. 3 shows a pertaining front perspective illustration of the rotary damper 1. The rotary damper 1 includes a generator which is operated by the mass movement and has a fixed first cylindrical damper part 3 which is configured in the form of a stator and received within the housing 6 and a second damper part 5 in the form of a rotor which is integrated in a first housing portion 11 of a hollow-cylindrical rotatable housing 6 on a side of the housing inner wall and rotatable in relation to the fixed first cylindrical damper part. The first damper part 3 is held in an end plate 13 of the rotary damper 1 in particular via an axial pin 12 which extends through the housing 6.

The housing 6 adjoins a ring-shaped receiving area 15 of the articulated lever 7 via a second housing portion 14. The ring-shaped receiving area 15 of the lever element 7 surrounds the second housing portion 14 to realize a fixed rotative connection. The ring-shaped receiving area 15 bears hereby upon the outer side of the second housing portion 14 of the housing 6 and the outer wall surface thereof so that pivoting movements of the lever element 7 can be transmitted into rotary movements of the housing 6. The attachment of the housing 6 on the vehicle body is realized via fixed ring-shaped bearing rings 6 which are arranged on the rotary damper 1 via bearing elements in the form of rolling bearings 17.

At a mass movement possibly caused by movements of a vehicle wheel, the housing 6, which includes the second damper part 5 and is connected directly with the lever element 7 that is movable by the mass movement, is caused to rotate. The lever element 7 pivots in and out perpendicular to the drawing plane so that the housing 6, as a result of the fixed rotative connection of the lever element 7 with the housing 6, and thus the second damper part 5 is caused to rotate.

As a result of the relative movement of the second damper part 5, integrated in the housing side and forming the rotor, in relation to the first fixed damper part 3 in the form of the stator, mechanical energy, produced when a vehicle body equipped with the rotary damper 1, is compressed, is recovered or converted into electric energy, which electric energy can be fed into an on-board power supply of a motor vehicle via suitable stator-side connections 18. The first damper part 3, i.e. the stator, includes hereby not shown windings. The connections 18 may be constructed in the form of or as part of a commutator housing which supports the axial pin 12 on a housing end wall side.

Recovery or conversion of the mechanical energy is based on the principle of magnetic induction, i.e. through interaction with an exciting magnetic field, magnetic induction generates a moment in opposition to the rotation of the second damper part 5, representing the damping force of the electric damper element 2. Likewise, it would also be conceivable to also generate electricity by the second damper part 5 in the form of the rotor, when the latter has respective windings instead of the first damper part 3. By tailoring a current application of the generator, the damping properties of the damper element 2 can be adjusted.

A vibration absorber 8 is also provided to reduce or suppress vibrations caused during operation of the rotary damper 1 and the motor vehicle and, in contrast to the embodiment shown in FIG. 1, is, however, not arranged on the lever element 7 but on the outer wall of the rotatable or rotating housing 6. As can be seen, a damping spring 9 is mounted in fixed rotative engagement to the housing 6 by shrink-fitting, gluing, welding, etc. and again connected in fixed rotative engagement with a damping mass 10 formed as elastomeric body or elastomeric piece.

The illustration of FIG. 3 shows again the arrangement of the vibration absorber 8 on the outer wall of the housing 6. As indicated by the arrows 19, 20, the vibration absorber 8 is arranged in fixed rotative engagement on the outer wall of the housing 6 so that a rotation of the housing 6 causes a rotation of the vibration absorber 8 to thereby reduce and dampen vibrations of the rotary damper 1 as a result of its mass inertia.

Figure 4:
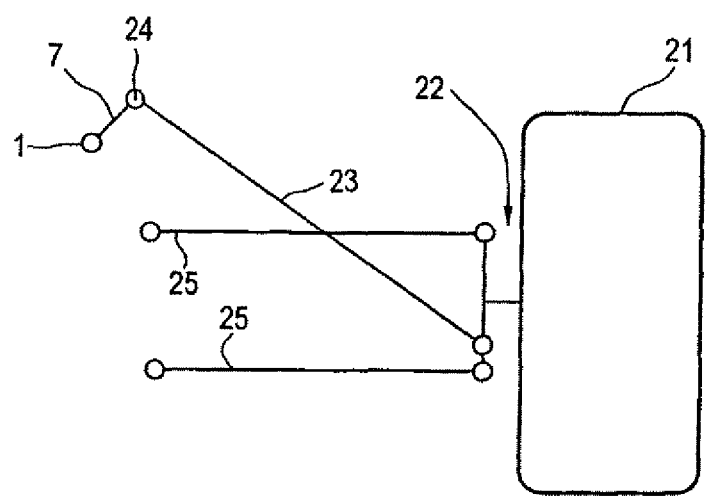
FIG. 4 a basic illustration of a possible installation situation of a rotary damper in the area of a motor vehicle axle.

FIG. 4 shows a basic illustration of a possible installation situation of a rotary damper 1 in the area of a motor vehicle axle. Shown as part of a motor vehicle is a vehicle wheel 21 together with a wheel carrier 22, on which a push rod 23 that is connected to the lever element 7 is arranged. The lever element 7 is supported for pivoting about the rotation axis 24, with the rotary damper 1 according to the invention being disposed in the rotation axis 24. It would also be conceivable to integrate the rotary damper 1 directly into the rotary suspensions of at least one transverse control arm 25. When the vehicle wheel 21 moves up and down, the lever element 7 is moved by the push rod 13 and pivoted about the rotation axis 24 to thereby operate the rotary damper 1 according to the invention in the described manner.

Although not shown in the Figures but still possible is the arrangement of a gear mechanism between the lever element 7 and the damper element 2. For that purpose, at least a first gear element is dynamically coupled with the lever element 7 and caused to rotate by the latter, and at least a second gear element is coupled directly or indirectly translated with the first gear element and dynamically coupled with the second damper part 5, such as to realize a rotary movement of the second damper part 5. The gear mechanism may, for example, be constructed as a planetary gear mechanism, strain wave gear mechanism, cycloidal gear mechanism, or spur gear mechanism.

What is claimed is:

1. A rotary damper for a motor vehicle, comprising:
   at least one damper element configured to dampen a relative movement between a first mass arranged on a wheel-suspension side of the motor vehicle and a second mass arranged on a vehicle-body side; and
   at least one vibration absorber arranged on the rotary damper,
   wherein the damper element has a fixed first damper part and a second damper part which is radially inwardly spaced from the first damper part so as to form a radially inner space between them, is coaxial with the first damper part, and is rotatably movable relative to the first damper part so as to apply a damping force, and
   wherein said vibration absorber is arranged coaxially with the first and second damper parts of the damper element outside of the radially inner space between the first and second damper parts of the damper element and forms an autonomous vibration system which acts in opposition to a vibration system of the damper element,
   wherein said vibration absorber is arranged radially outwardly of the first and second damper parts of the damper element.

2. The rotary damper of claim 1, further comprising a lever element coupled via a rotation-transmitting connection to the second damper part and connected to the first mass so as to be movable when the first mass moves and thereby transmit a rotary movement to the second damper part, said at least one vibration absorber being arranged on the second damper part or the lever element.

3. The rotary damper of claim 1, wherein the vibration absorber includes at least one elastically resilient damping spring element and at least one damping mass connected to the spring element via a vibration-transmitting connection, and wherein the spring element is located between the damping mass and the second damper part or the lever element connected to the second damper part.

4. The rotary damper of claim 1, wherein the spring element is constructed as mechanical spring or rubber-elastic elastomeric member.

5. The rotary damper of claim 1, wherein the damping mass is a mass body formed of elastomer or metal.

6. The rotary damper of claim 1, wherein the damper element includes a hollow-cylindrical housing in which the first and second damper parts are received or integrated.

7. The rotary damper of claim 1, wherein the first and second damper parts are each constructed as hollow-cylindrical body, with either the first damper part being received within the second damper part or the second damper part being received within the first damper part.

8. The rotary damper of claim 1, further comprising a gear mechanism linking the lever element and the damper element and including at least a first gear element which is dynamically coupled with the lever element and caused to rotate by the lever element, and at least a second gear element which is coupled directly or indirectly with the first gear element and dynamically coupled with the second damper part such as to cause a rotary movement of the second damper part.

9. The rotary damper of claim 8, wherein the gear mechanism is configured as planetary gear mechanism, strain wave gear mechanism, cycloidal gear mechanism, or spur gear mechanism.

10. The rotary damper of claim 1, constructed as hydraulic rotary damper, said at least one damper element being configured as a hydraulic damper element.

11. The rotary damper of claim 1, constructed as electric rotary damper, said at least one damper element being configured as an electric damper element.

12. The rotary damper of claim 3, wherein the damping spring element and the damping mass are disk-shaped and coaxial with one another, the disk-shaped spring element concentrically surrounds the second damper part, and the disk-shaped damping mass concentrically surrounds the disk-shaped spring element.

13. The rotary damper of claim 3, wherein the damping spring element and the damping mass are disk-shaped and coaxial with one another, the disk-shaped spring element is arranged on an axial end surface of the lever element, and the disk-shaped damping mass is arranged on an axial end surface of the disk-shaped spring element.

14. A rotary damper for a motor vehicle, comprising:
at least one damper element configured to dampen a relative movement between a first mass arranged on a wheel-suspension side of the motor vehicle and a second mass arranged on a vehicle-body side; and
at least one vibration absorber arranged on the rotary damper,
wherein the damper element has a fixed first damper part and a second damper part which is radially inwardly spaced from the first damper part so as to form a radially inner space between them, is coaxial with the first damper part, and is rotatably movable relative to the first damper part so as to apply a damping force, and
wherein said vibration absorber is arranged coaxially with a continuation of an axis of the first and second damper parts of the damper element outside of the radially inner space between the first and second damper parts of the damper element and forms an autonomous vibration system which acts in opposition to a vibration system of the damper element,
wherein said vibration absorber is arranged outwardly of the first and second damper parts of the damper element as considered in an axial direction.

* * * * *